(12) United States Patent
Herskovic

(10) Patent No.: US 12,551,719 B2
(45) Date of Patent: Feb. 17, 2026

(54) PULSATING BRACHYTHERAPY METHOD AND SYSTEM

(71) Applicant: Arnold M. Herskovic, Chicago, IL (US)

(72) Inventor: Arnold M. Herskovic, Chicago, IL (US)

( * ) Notice: Subject to any disclaimer, the term of this patent is extended or adjusted under 35 U.S.C. 154(b) by 0 days.

(21) Appl. No.: 18/935,287

(22) Filed: Nov. 1, 2024

(65) Prior Publication Data

US 2025/0058145 A1    Feb. 20, 2025

Related U.S. Application Data

(63) Continuation-in-part of application No. 18/212,096, filed on Jun. 20, 2023, which is a continuation-in-part of application No. 17/941,965, filed on Sep. 9, 2022, now abandoned.

(60) Provisional application No. 63/243,092, filed on Sep. 10, 2021.

(51) Int. Cl.
*A61F 5/10* (2006.01)
*A61N 5/10* (2006.01)

(52) U.S. Cl.
CPC .... *A61N 5/1015* (2013.01); *A61N 2005/1003* (2013.01); *A61N 2005/1024* (2013.01)

(58) Field of Classification Search
CPC .......... A61N 5/1015; A61N 2005/1003; A61N 2005/1024
See application file for complete search history.

(56) References Cited

U.S. PATENT DOCUMENTS

| | | | | |
|---|---|---|---|---|
| 5,429,582 A | * | 7/1995 | Williams | A61N 7/02 607/3 |
| 5,616,114 A | * | 4/1997 | Thornton | A61N 5/1002 600/3 |
| 5,776,175 A | * | 7/1998 | Eckhouse | A61N 5/06 607/90 |
| 7,056,274 B2 | * | 6/2006 | Apple | A61N 5/1002 604/101.02 |
| 2004/0087827 A1 | * | 5/2004 | Lubock | A61N 5/1015 600/3 |
| 2005/0054994 A1 | * | 3/2005 | Cioanta | A61B 10/02 604/317 |
| 2005/0124843 A1 | * | 6/2005 | Singh | A61N 5/1014 600/3 |
| 2007/0167667 A1 | * | 7/2007 | Lubock | A61N 5/1015 600/3 |
| 2012/0190911 A1 | * | 7/2012 | McKenna | A61N 1/406 604/20 |

\* cited by examiner

*Primary Examiner* — Samuel G Gilbert
(74) *Attorney, Agent, or Firm* — CHERSKOV FLAYNIK & GURDA, LLC

(57) ABSTRACT

A method for treating a tumor excise site defined by a center and edges is described. The method includes simultaneously exposing the tumor site to radiation and pulsating heat. Also described is a device for treating tumors at a target site. The device includes a first balloon containing a radio isotope and a second balloon encasing the first balloon. The second balloon defines structures to create a void between the first balloon and the second balloon such that pulsing, temperature treated fluid traverses the void.

11 Claims, 9 Drawing Sheets

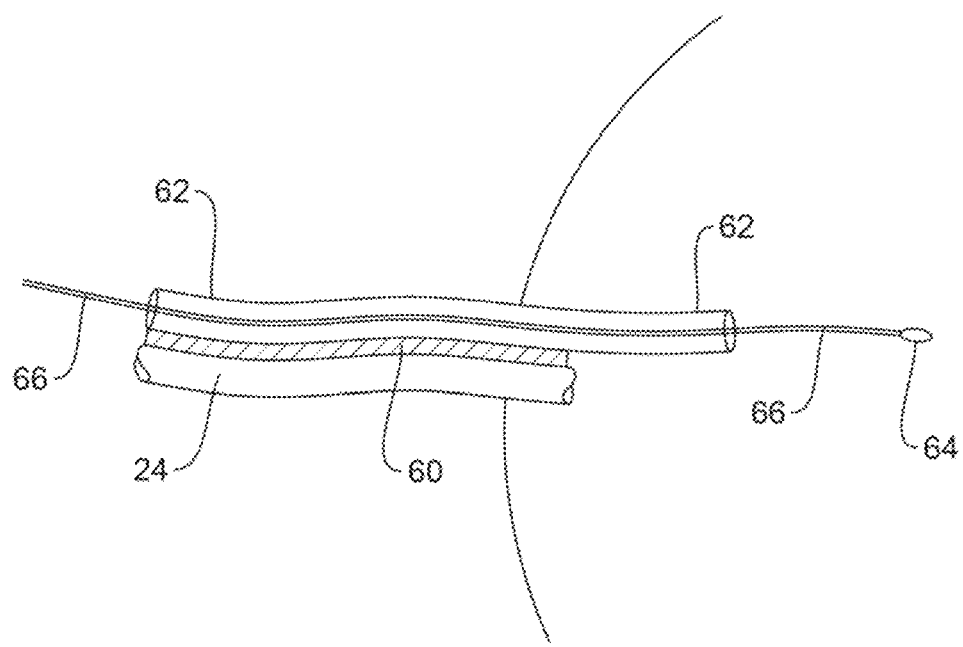
FIG. 6
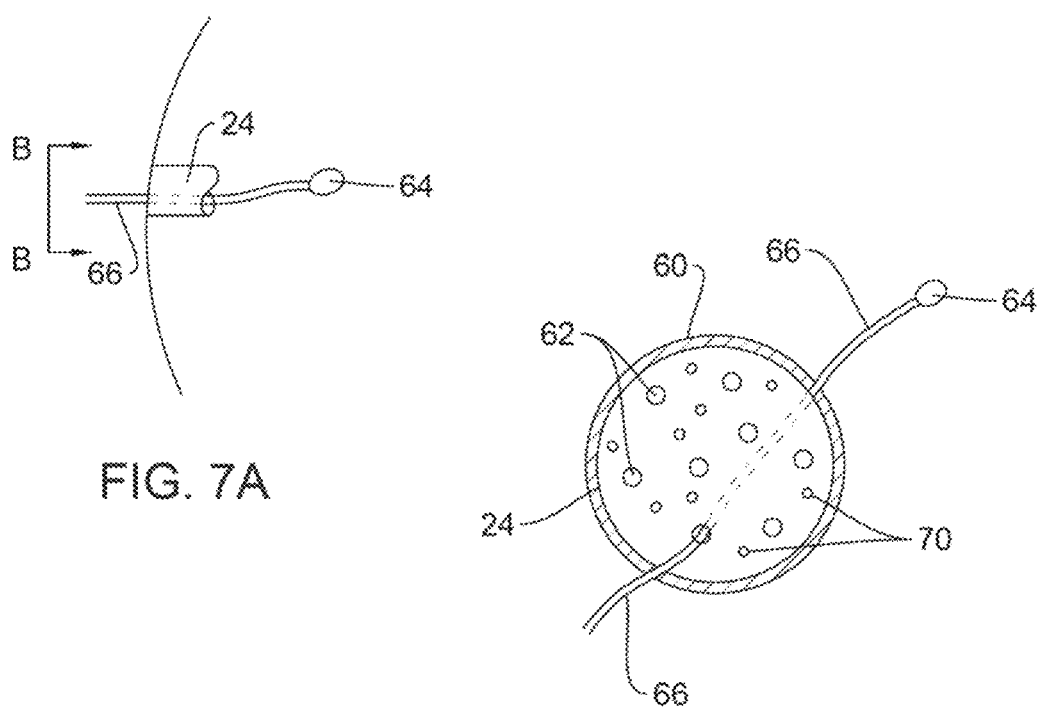
FIG. 7A
FIG. 7B

PULSATING BRACHYTHERAPY METHOD AND SYSTEM

PRIORITY INFORMATION

This Continuation In Part Utility Patent Application claims the benefits of U.S. Utility patent application Ser. No. 18/212,096 filed on Jun. 20, 2023 as a Continuation In Part of U.S. Utility patent application Ser. No. 17/941,985 filed on Sep. 9, 2022, which issued as U.S. Pat. No. 11,771,919 on Oct. 3, 2023, and U.S. Provisional Patent Application No. 63/243,092, filed on Sep. 10, 2021, the entirety of which is incorporated herein by reference.

BACKGROUND OF THE INVENTION

1. Field of the Invention

This invention relates to brachytherapy and more specifically, this invention relates to a device and method for optimizing radioisotope dose distributions and heat for in vivo treatment of tumors.

2. Background of the Invention

Treatment of some tumors has not significantly changed in the past 30 years. Generally, resection is made, and then followed up with radiation and/or chemotherapy, the former via brachytherapy which is insertion of a radioactive stent at or proximal to the resection site. (A major advantage with brachytherapy is the limiting of collateral radiation.)

However, many aggressive neoplasms remain intractable. These neoplasms may manifest as defects, tumors (e.g. glioblastomas), or other intracranial/extra cranial maladies such as meningiomas, and gliomas. In situ bladder tumors and selective resected primary and metastasis have a high chance of recurrence and may similarly benefit from brachytherapy-related strategies.

In modern oncologic practice the advancements in surgical, theragnostic, chemotherapy, and immunotherapy have improved survivals, and longevity. These factors have increased the value of focused treatment modalities which minimize collateral radiation exposures. This contrasts to the heretofore typical (but still used) experiences of radiating regional volumes in selected patients. The downside of those external originating radiations was always collateral exposures whether stereo tactically directed, intensity modulated, or infused.

Glioblastoma is a common, aggressive, treatment-refractory brain tumor causing a startling 3-4 percent of all cancer deaths. Life expectancy after initial diagnosis is short and on the order of 15 months.

Despite best available treatments such as radiotherapy, surgical resection, and chemotherapy, Glioblastoma remains, for the most part, an incurable disease. Patients typically succumb to recurrence at the original tumor site, despite adequate resections. The distinction between recurrence and persistence is clinical as subclinical tumors may persist despite aggressive imaging and local therapy.

Recurrence/persistence of glioblastomas is one of the most difficult challenges faced by clinicians. This is because of limited treatment tolerance of adjacent physiological structures. Generally, there is a lack of effective and tolerable treatments available for glioblastomas, and this demonstrates the critical need for innovative, novel treatment strategies.

Radiotherapy (including brachytherapy, stereotactic radiation, intensity modulated radiotherapy, neutron- and other-particle teletherapy) is also far from curative in glioblastoma multiformes (GBMs) and can only reduce the tumor burden within the brain to slow the disease process. In fact, 80 percent of tumors recur near the original tumor location, regardless of treatment.

Radiation dose steeply decreases (e.g., exponentially) from close to the source out to the treatment site. The ratio of a first original radiation dose to a second or third or fourth dose at a given point away from the source, produces a gradient. This steep dose gradient mimics the "Inverse square law" particularly at greater distances from the sources which may limit collateral radiation exposures. This often causes problems as the dose to the tissues closest to the radiation sources often produces a "hot area", colloquially called $D_{MAX}$, compared to that delivered to the target volume.

Brachytherapy excluding tagged isotopes is often characterized as HDR, LDR and vLDR. HDR (High Dose Rate) brachytherapy is commonly delivered via a very high activity seed, for example 10 Curies (Ci) of Iridium 192. The main HDR brachytherapy advantages are radiation safety and geometric assurance. It utilizes an instrument comprising a very high activity source (e.g., a seed measuring about 1 mm by 8 mm and usually about 4.5 mm in length) at the distal end of a cable, the distal end of which could be located with precision. The cable is about a meter in length. The source, most commonly is an Iridium 192 seed, and is sequestered in a shielded container when not in use.

Non-invasive brachytherapy is limited by the typical large radiation dose gradient from the dose closest to the sources and an effective and/or treatment depth which is often 0.5 cm (but may need to be deeper). As an example, the simple addition of a 0.5 cm spacer between the superficial dose ($D_{MAX}$) and a 0.5 cm prescription point changed the superficial dose to prescription point ratio from 2.24 to 1.67 per Mark Rivard Monte Carlo calculations of a 4 cm Glia Site spheroid. In many circumstances this dose gradient is related to toxicity. A situation in which there is no dose gradient would involve invasively placing sources within the treatment volumes, but this may impact critical structures.

As to brain maladies, the radiation field remains restricted in dose and/or in volume as there are critical structures (e.g. the brain stem, the optic tracts, the hippocampus speech center, etc.) which are extra sensitive to radiation exposure. For example, studies have demonstrated no survival improvement with whole-brain radiotherapy in this clinical situation. Rather, a higher incidence of treatment-induced brain injury occurs compared with regionally applied radiation, as evidenced by cognitive impairment.

Chemo-immuno radiotherapy (CIRT) has been extensively utilized as a first-line treatment for post resection glioblastoma patients in combination with radiation therapy. (Temodar® and PCV chemotherapy have provided some improvement in survival rates.)

Altogether, despite multiple treatment approaches attempts and a longstanding field of research, glioblastoma patients still have one of the most dismal survival rates and urgently require an alternative solution to prolong survival and quality of life. A major challenge in developing effective therapies for glioblastoma is the tumor location: the human brain.

Past efforts (e.g., U.S. Pat. No. 4,763,671) for treating tumors included using catheters to deliver high frequency power, externally applied hyperthermia and radiation into a tumor site. But these techniques fall short of treating the excised tumor site in a form fitting manner, and so risk not exposing all aspects and remnants of a tumor mass.

Other efforts (U.S. Pat. No. 5,364,336) utilized microwave antennas for delivering heat and radiation to tissue. But these systems are not in vivo in design, not portable, and limited in time of application.

Neither of the two aforementioned patents are optimal modalities for radiation dose delivery or for thermal treatment.

Current hyperthermic treatments have been relegated to about one hour every other day, given patient intolerance to more frequent heat applications, practical considerations and thermal tolerance. Successful concomitant hyperthermic-, and radiation-treatment has not been achieved.

A need exists in the art for a system and method for treating glioblastoma that demonstrate a benefit greater than the risk of damaging brain tissue. Radiation with hyperthermia, for example, could be administered within a range to sterilize the tumor tissue without causing toxic damage to the surrounding normal tissue, heretofore a greatly limiting factor. The effectiveness of the radiation could be supplemented with a second or third treatment modality (e.g., hyperthermia, chemotherapy, immuno-therapy) but without causing unacceptable toxicity to the brain during treatment.

SUMMARY OF INVENTION

An object of the invention is to provide a system and method for treating post resection tumor sites (or naturally occurring cavities) that overcomes many of the drawbacks of the prior art.

Another object of the invention is to simultaneously enhance the efficacy of radiation and hyperthermia when treating illness. A feature of the invention is the utilization of a plurality of voids (wherein a brachytherapy vehicle incorporates a first void) to improve the depth dose delivered. (Depth dose is the ratio of the dose at the radiation source to the dose at the prescription point.) Given the LDR energies (e.g., less than or equal to 100 keV, and typically between about 20 and 100 keV) utilized in the invented treatment, the tissue $D_{MAX}$ dose is very high. HDR brachytherapy utilizes radiation sources with higher energies, e.g., 200 keV to 800 keV. An advantage of the invention is that the imposition of such voids, and/or increasing the volume of radioactive materials, reduces the slope of the dose (also called the depth of dose) decrement. Inasmuch as potential toxicities are influenced by treatment doses, the homogeneity due to the increased volume of void-containing delivery vehicles within a tumor site provided by the invention enhances tolerable tumor response.

Yet another object of the invention is to provide a system and method for treating glioblastoma and other spheroidal cavity sites. A feature of the invention is utilization of brachytherapy and heat, both of which may be simultaneously applied in vivo. An advantage of the invention is that radiation dose rates and doses are kept below toxic thresholds but with a concomitant increase in survival rates.

Still another object of the invention is to provide a method for treating glioblastoma. A feature of the invention is the in vivo combination of brachytherapy and heat (in a range from 35-45° C., and preferably from 38-42° C.). An advantage of the invention is that it provides improved local control with reasonable tolerance. This is unexpected in glioblastoma treatment protocols inasmuch as that malady most frequently recurs or persists at the location of the original tumor. The advantage of the invention is that brachytherapy in combination with heat treatment within a patient has a geographic dose delivery advantage, which both limits radiation exposure to non-involved parenchyma while improving patient response.

Yet another object of the present invention is to provide an intrinsic compact device for treating glioblastoma. A feature of the device is that it molds itself to the targeted tissue, commonly the post resection surgical site. An advantage of the invention is that it provides radiation treatment, hyperthermia treatment, and waste/fluid removal, the latter perhaps simultaneously from a target site. This fluid removal feature could be utilized to diffuse other medications, such as chemo-immunotherapy agents. The invention's utilization of very low energy and dose rates enables outpatient treatment delivery. Applications using higher energy sources are enabled, with due safety considerations related to those high energy usages.

Still another object of the present invention is to optimize dose delivery to a tumor site. A feature of the invention is delivering radiation and heat, perhaps simultaneously but within separate, dedicated void spaces. An advantage of the invention is that the voids define "spacers" to optimize radiation dose delivery while remediating (or even eliminating) confounding post-surgical fluid collections, and also enabling the addition of other treatment modalities such as diffusible medications, nanoparticles, and other vehicles. The spacer could be occupied by a flexible matrix material in addition to the multifunctional drains and connections to circulate pulsating warm/cool fluids. The fluids may have a lower specific heat than water making the process more efficient.

Another object of the present invention is to maximize the effectiveness of hyperthermic and radioactive treatment to tumor sites. A feature of the invention the imposition of a thermal gradient at the site. An advantage of the invention is that hyperthermic treatment is optimized using less heat, thereby minimizing trauma damage to healthy tissue.

Briefly, the invention provides a method and device for treating a tumor excise site defined by a center and edges, the method comprising simultaneously exposing the tumor site to pulsating heat and radiation.

The term balloon as used in this specification defines a reversibly expandable container generally having a main means of fluid ingress and egress. Additional portals may be integrally molded to the container so as to allow separate ingress/egress means for gasses, chemicals that need to be initially provided separately before mixture within the balloon, temperature sensors, and chemical sensors The container may be comprised of a material selected from the group consisting of biocompatible webbing such as silicone, polymer such as polylactide-co-epsilon-caprolactone (also known as ProSpace™, BioProtect Ltd, Tzur Igal, Israel), and combinations thereof. Generally, exemplary polymers are those that tolerate radiation pressure and osmotic gradients and are reproducibly expanded and contracted once placed inside patients.

An embodiment of the invention provides a system for treating tumors, the system comprising a first balloon adapted to receive radioactive isotope; a second balloon encapsulating the first balloon; and a third balloon encapsulating the second balloon wherein a space exists between the first balloon and the third balloon. The middle balloon may act as a spacer or radiation and thermal insulating layer disposed between the radioisotope contained in the inner or core balloon and the patient so as to provide homogeneity of both the radiation dose and heat. This will protect or otherwise compensate for natural heat sinks in the body such as adjacent, un-diseased vasculature. This second balloon may contain a wire framework (for example comprised of Nitinol) adapted to accept and store heat generated by the radioisotope or otherwise supplied external to the patient. The second balloon (and its reversibly closable means of ingress/egress) may also accommodate any electronic device envisioned for use in this method, the electronic device including a thermocouple, dosimeter, heating element, etc.

The outer or third balloon may be similar to a polymer constructed surgical drain, such that a distal end of its drain conduit terminates either sub-galeal or in a reservoir located outside of the patient. ("Galeal" designates the connective tissue between the scalp and skull.) The third balloon, encapsulating the second balloon, may define a drain to either allow detritus to enter it, or to allow excess fluid to exit from it, particularly in situations where reverse pressure is utilized to infuse surround tissue with medicament contained by the third balloon.

The balloons may be combined in function. For example, in HDR applications wherein the radiation source is in a catheter, the fluid may flow around or otherwise wash over the catheter. HDR is attractive for its wide acceptance. This is because of radiation safety and verification of positioning. However, HDR applications require fractionation (i.e., multiple treatments) and shielded rooms. Notwithstanding, the advantages of an HDR application includes using a single isotope void space (such as a balloon), wherein that void space is bathed or otherwise encapsulated with circulating fluids, themselves sequestered within a second surrounding structure. That second surrounding structure further may include a drain to the outside of the situs of the injury. As discussed below, one wall of the interface between the HDR catheter and the drain may be elastic so as to minimize binding, otherwise an issue when an HDR source and its delivery cable are inserted there-through.

In summary of this point, the space defined by a scaffold, or void in the second balloon allows the depth dose ratio and thermal gradient to flatten out or otherwise decrease by a significant factor (e.g., between 1 and 3) in the case of glioblastoma stents. This provides a means for minimizing the dose at the surface of the delivery vehicle.

The invention also provides an in vivo method for treating glioblastoma at a target site, the method comprising concomitantly or sequentially contacting the target site with radiation and heat; wherein the contacting step further comprises molding a radiation and heat emanating surface to the target site; and removing debris from the target site. The application of both radiation and heat may occur simultaneously, or with heat being added after radiation dosage, or vice versa which is to say heat added first, followed by radiation application.

The invention provides a device for treating a tumor excise site defined by a center and edges, the device comprising a first temperature sensor at the center and a second temperature sensor at the edges (i.e., "rim" of the excise site); a conduit to pulsate heat to the center; and a container positioned at the center, the container adapted to receive radio-isotope. Thermal sensors may be extended into the target rim. A plurality of drainage tubes may be disposed between the exterior surface and the edges. Placement of the drainage tubes separates the exterior surface from the edges a distance between 1 mm and 10 mm.

BRIEF DESCRIPTION OF DRAWING

The invention together with the above and other objects and advantages will be best understood from the following detailed description of the preferred embodiment of the invention shown in the accompanying drawings, wherein:

FIG. 6 is an elevational view of a combination drain-hdr delivery conduit, in accordance with features of the present invention;

FIG. 7A is a side view of a drain assembly integrally molded to a balloon wall, in accordance with features of the present invention; and FIG. 7B is a view of FIG. 7A taken along line B-B, in accordance with features of the present invention;

DETAILED DESCRIPTION OF THE INVENTION

Figure 1:
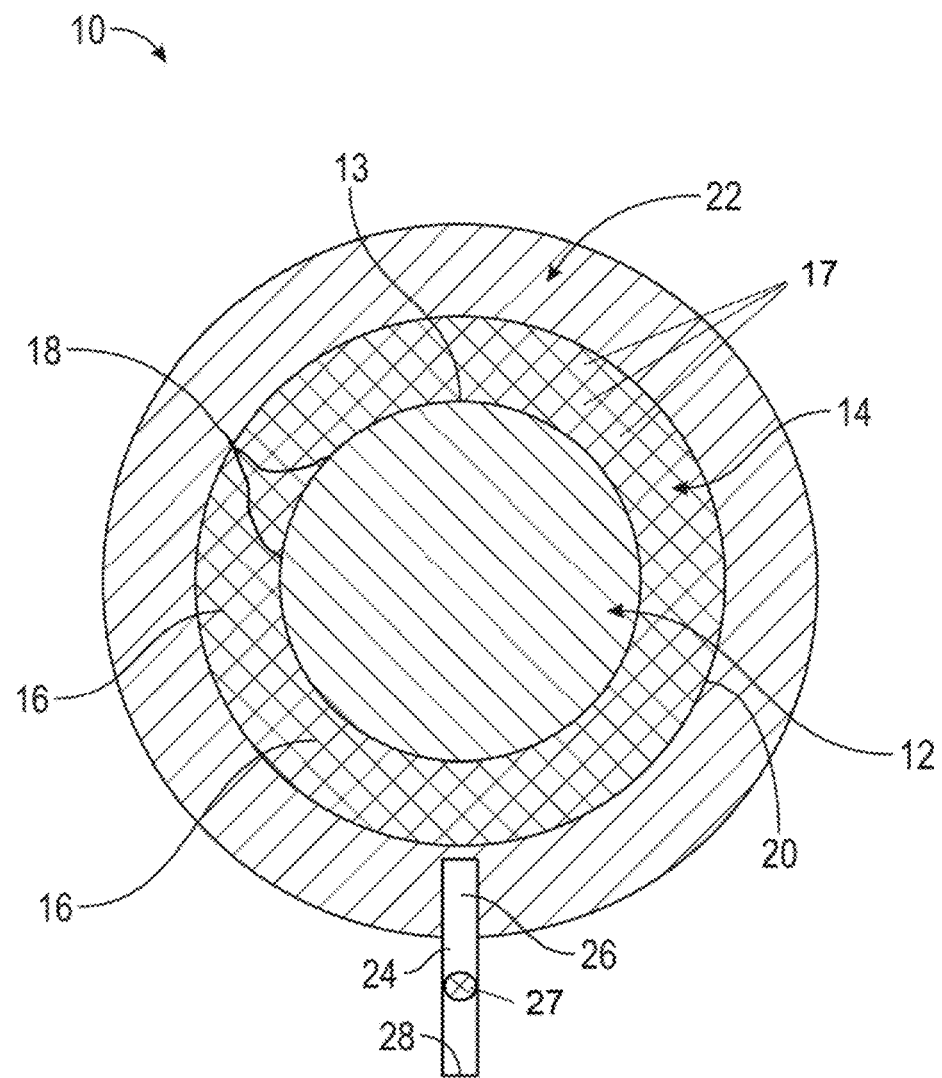
FIG. 1 is a schematic elevational view of a three balloon configuration for in vivo treatment of spheroidal tumors such as glioblastoma, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention enables the application of continuous lower dose rate brachytherapy with pulsating application of thermal energy (e.g., heated fluid), better feedback control of local hyperthermia, removal of unplanned fluids displacement between the device(s) and tissues and infusion injections of various chemotherapy- and immunotherapy-substances, nanoparticles, or other medicaments.

This invention is designed to treat tumor sites, post resection, and also to treat the resulting surgical cavities. Many surgical defects are spheroidal (i.e., hollow), rectangular, cuboidal, or combinations thereof such that non-spheroidal sites need to be accommodated. There are situations in which the organ at risk has a natural cavity e.g. urinary bladder and gall bladder in which the invention can be utilized.

The invention allows for radiation brachytherapy treatment to be delivered by a high dose rate (e.g., usually 20 gy/hr), a low dose rate, or very low dose rate, the last often considered permanent brachytherapy.

The invention provides a method and system for administering moderate hyperthermia in a pulsating fashion (typically up to about 42° C. and even up to 45 C) and low-dose rate (LDR), very low dose rate (VLDR) or high dose rate (HDR) brachytherapy in the brain following surgical resection of a primary or a secondary tumor. This thermobrachytherapy combination not only creates a novel treatment option for patients, but also may improve glioblastoma prognosis and increase the aforementioned patient survival rates with reasonable tolerance—a goal that has never before been successfully achieved by any significant margin in this field.

Specifically, the invention provides a method and system for simultaneously or sequentially applying brachytherapy and heat in a synergistic approach to control Glioblastoma. The radiation and controlled heat is delivered safely and simultaneously to the tumor resection cavity.

The invention leverages the inventor's observation that the dose ratio in esophageal stents can decrease by a factor of 3 to 4 from superficial $D_{MAX}$ out to 0.5 centimeters. From 0.5 centimeters to 1 centimeter, the dose again decreases but by a lower factor. This is known as a decrease in the dose gradient. In typical brachytherapy applications, the dose at the surface of say a 4 centimeter sphere has a rapid fall off at diameter 5 cm. So, by adding a second void between the radiation source and the target tissue (whereby the void is created by a scaffold or balloon with a predetermined diameter, e.g., 5 cm), the dose decrement or the dose gradient is reduced. When a pulsating heated fluid is injected into this void, or in structures defining the void, the resultant brachytherapy absent the aforementioned collateral damage, is enhanced.

Brachytherapy has most frequently utilized seeds but more recently, liquid or colloid isotopes are being utilized, even some linked to moieties like octreotide or PSA antigen. The inventor's stent topography designs (U.S. Pat. No. 11,964,029, incorporated herein by reference) minimize stent slippage which occurs fairly frequently in the GI tracts, for example due to vectoring peristalsis, fluid drainage shaping, patient movement, and other phenomenon. Testing of patterns such as cones, ridges, and barbs radially extending from the surface of brachytherapy stents have demonstrated significant requirements from ten to 150 Newtons greater force needed for dislodgement, as well as well as a user-friendly means to detect slippage (p) by the patient even at home. The use of these topographical designs for the treatment of all GI, thoracic, ductal sites is now possible.

In an embodiment of the invention, a heated media (e.g. water) is coursed through the voids formed by the radially extending forms (e.g., the aforementioned cones, ridges, and barbs) to optimize hyperthermic treatment of the parenchyma reversibly captured by, in physical contact with, or otherwise interacting with the distal ends of the forms.

A salient feature of the invention is establishing both an optimized radiation gradient (i.e., depth of dose) and a thermal gradient spanning a tumor excision site. The gradients may or may not exist simultaneously. The gradients may or may not always be present together.

The gradients may be fine tuned via the following factors:
Increasing the volume of the isotope as the total activity remains the same.
The addition of spaces (e.g. starting with a ½ cm space from $D_{MAX}$ and then proceeding in predetermined increments thereof out to the target tissue.
The utilization of a flexible mesh, and/or the placement of innumerable spacers.
Filtration with high atomic number material between the isotopes and the patient so as to improve the gradient In an embodiment of the invention, temperature at a resection site is adjusted in vivo and compensated for the heat energy loss thru conduction/convection and could produce continuous hyperthermia. Feedback mechanisms (e.g., sensors such as thermocouples) to modulate the tissue's temperature are concomitantly provided.

The heat gradient is positively affected by pulsating the thermal energy (e.g., heated water) and potentially using a relatively lower specific heat material. The pulsations occur as the fluids with a relatively lower specific heat are circulated and replaced frequently allowing a relative cooling of the tissues on the inner surface of what is referred to as the rim. (Target tissue peripheries often have the geometry of a "rim."). Exemplary pulsed fluids include distilled water, saline, spinal fluids, and combinations thereof. Whatever circulation fluid is chosen, rapid replacement of the pulsing fluid is independent of the specific heat. For example, if the target volume is 115 cc the fluids could be replaced or recirculated twice a minute. Optimization of circulation times are determined empirically.

In addition, thermal conduction between the balloon surface and the patient's tissue may be increased via a modified topography of the exterior surface of the balloon, wherein regions of the balloon surface define bumps, ridges, depressions, cones, parabolic cones and depressions. The size of these shapes may range from 0.5 mm to 5 mm in height. The shapes may partially cover or completely cover the exterior surfaces of the balloon.

Heat conduction can be positively affected by increasing the contact area which can easily be accomplished by including innumerable regularly placed cones, pyramid, ridges parabolic cones etc. The actual increased surface area should be greater than the surface area of at least the ½ cm rim preferably both. Practical considerations are actual tissue tolerance.

An embodiment of the method involves circulating fluid with as low a specific heat as reasonable which would alternate between relative coolness and warmth. As such, selecting a fluid with a specific heat no higher than water (4.186 joules per gram per degree Celsius) is suitable. Most liquids other than water have a lower specific heat capacity due to water's unique molecular structure that allows it to absorb more heat energy before experiencing a temperature change. Such fluids include alcohols, carboxylic acids, organic solvents, vegetable oils and combinations thereof. The intent is to flatten the heat dissipation curve such that the tissue most remote from the isotope (i.e., within ½ or 1 cm either side of the rim) would be warmer than areas nearest radiation source and/or heat source. The lowest reasonable specific heat would allow a quicker thermal change. The heat transmission passing thru the balloon wall has to be considered. The circulation of the appropriate temperature fluids quickly pulsating would compensate at least in part the heat sink loss.

As depicted in FIG. 1, the invented device (designated as numeral 10) is a nested multi-balloon design, wherein each balloon is intended for specific applications to meet various treatment challenges. FIG. 1 features three balloons, but fewer or more balloons may be used, depending on the treatment sought, the radioisotopes used, and the amount of heat desired to be distributed. (For example, a one-balloon system, or a two-balloon system also may be utilized.)

The innermost balloon 12 is adapted to contain the radio isotope or a plurality of radio isotopes. To aid in the pliability of the overall construct, the radioisotope(s) may be contained within a liquid carrier so as to be a solute in a solvent contained by the first or innermost balloon. Alternatively, the radioisotope itself may be of a liquid phase. Inasmuch as there is no perfect or standard radioisotope, the device is compatible with a variety of radioisotope options, thereby allowing the physician to select the most optimal radio isotope for each individual patient.

In an embodiment of the invention, the first balloon defines a single void or space (e.g., sans any internal partitions or barriers which would otherwise form sub spaces) such that the radioisotope is free flowing throughout the entire void. The isotope may be inserted via syringe through a skirt (i.e., the neck) of the balloon. Alternatively, the balloon maybe immersed within a solution containing the radioisotope and allowed to expand, after which the skirt or neck is tied off, melted closed, or sealed closed via adhesive.

Other means of ingress/egress may be utilized. For example, the balloon may be integrally molded with a septum to allow deflated transport to the surgical facility; the balloon being inflated by the surgeon via syringe whereby the needle of the syringe reversibly breaches the septum barrier. This syringe approach will allow the balloon to be inflated in a bespoke fashion after the surgeon determines the metes and bounds of the resection site. The septum is designed to prevent leakage of the fluid isotope from the first balloon.

Alternatively, or in combination with the above closing means, the balloon containing the isotope may further comprise a valve (element 17, FIG. 3) which may be reversibly opened or closed.

The radioactive isotope is a medical isotope selected from the group consisting of cesium-133, iodine 125, samarium (e.g., Sm153), ytterbium (e.g., Yb169), palladium (e.g., Pd103), iridium (e.g., Ir192) and combinations thereof, and other radio isotopes. The radiation strength is selected to deliver either low dose radiation (LDR) or very low dose radiation (VLDR) brachytherapy over a finite period of time. The implant may be permanent or semi-permanent. As such, dosages provided by the radio-isotopes typically may be between 20 grays (Gy) and 100 Gy. Preferably, the ratio of $D_{MAX}$ and depth dose is less than 2, which means that the radiation dose at the radiation source does not decrease by more than half at the eventual treatment site. This will minimize any hot spots which therefor will decrease the risk of radio necrosis, ulcerations, fistulas, etc. Thus, good tolerance is conferred.

A secondary spacer balloon 14 encapsulates or otherwise contains the inner balloon 12. This spacer balloon has a diameter sufficient to improve depth dose characteristics (e.g., a diameter ranging from 0.25 to 0.75 cm and preferably 0.5 cm.) The inner balloon (aka a brachytherapy "stent") will be monitored to ensure leak-proof containment of radioactive solution. Monte Carlo calculations, which defines a well-established class of computational algorithm assess radiation depth, homogeneity of distribution, and maximal doses. An optimum ratio of maximum dose (Dmax) to depth should be less than 2; this to provide good tolerance against over exposure to radiation and heat.

The second balloon defines a scaffold 16 (e.g. a webbing, net, or grid), which may be rigid, semi-rigid, or flexible. (In an embodiment, the device would conform to the shape of the surgical defect or organ volume, such as the bladder.) The scaffold may define a porous structure capable of absorbing and perhaps homogenizing the heat, medicament or any other fluid substance in physical contact with the porous structure. Alternatively, the scaffold may define an adsorbent so as to adsorb materials for later distribution during treatment, depending on pH, temperature, solubilities, emf exposure, etc., per treatment protocols.

Another alternative is a scaffold replacing the second balloon whereby the scaffold defines an innermost surface 18 contacting the first balloon 12, and a radially displaced surface contacting the third balloon 22. As depicted in FIG. 4B, radially extending struts 21 may be provided to maintain the space defined by the innermost surface 18 and outermost radially displaced surface 24 of the scaffold such that no other structures aside from the struts exist between an exterior surface 13 of the first balloon and the third balloon.

Instead of struts, the scaffold may comprise a second balloon to maintain the distance between the first balloon and the third balloon.

Generally, the scaffold has a first surface 18 contacting the exterior surface 13 of the first balloon 12. The scaffolding 16 creates a space "S" or plurality of spaces (e.g. a void or plurality of voids) for dissipation of heat generated by the radio-isotopes, or of the heat supplied from outside the body.

A purpose of the scaffolding is to provide space (e.g., approximately 0.2 to 0.7 cm, and preferably 0.5 cm) to allow the depth dose curve to flatten and potentially as a means to produce the hyperthermia. The nitinol framework can generate heat by electrical charging, stressing, for example by phase conversion of austenite to martensite (as discussed infra), and similar phase changes exhibited in other metals. For example, nitinol can be heated with an in vitro or in vivo DC power source to a temperature of between 35° C. and 45° C. Another embodiment of heat generation may involve fluid circulating from outside the body and that is raised to a particular temperature prior to insertion within the body.

The scaffolding creates a void or voids that is/are radially displaced from the internal void defined by the first balloon 12. Heat generation and transfer to target sites radially displaced from a second exterior surface 20 of the second balloon is thus more effective within the spacer balloon rather than within the larger inner balloon.

Figure 3:
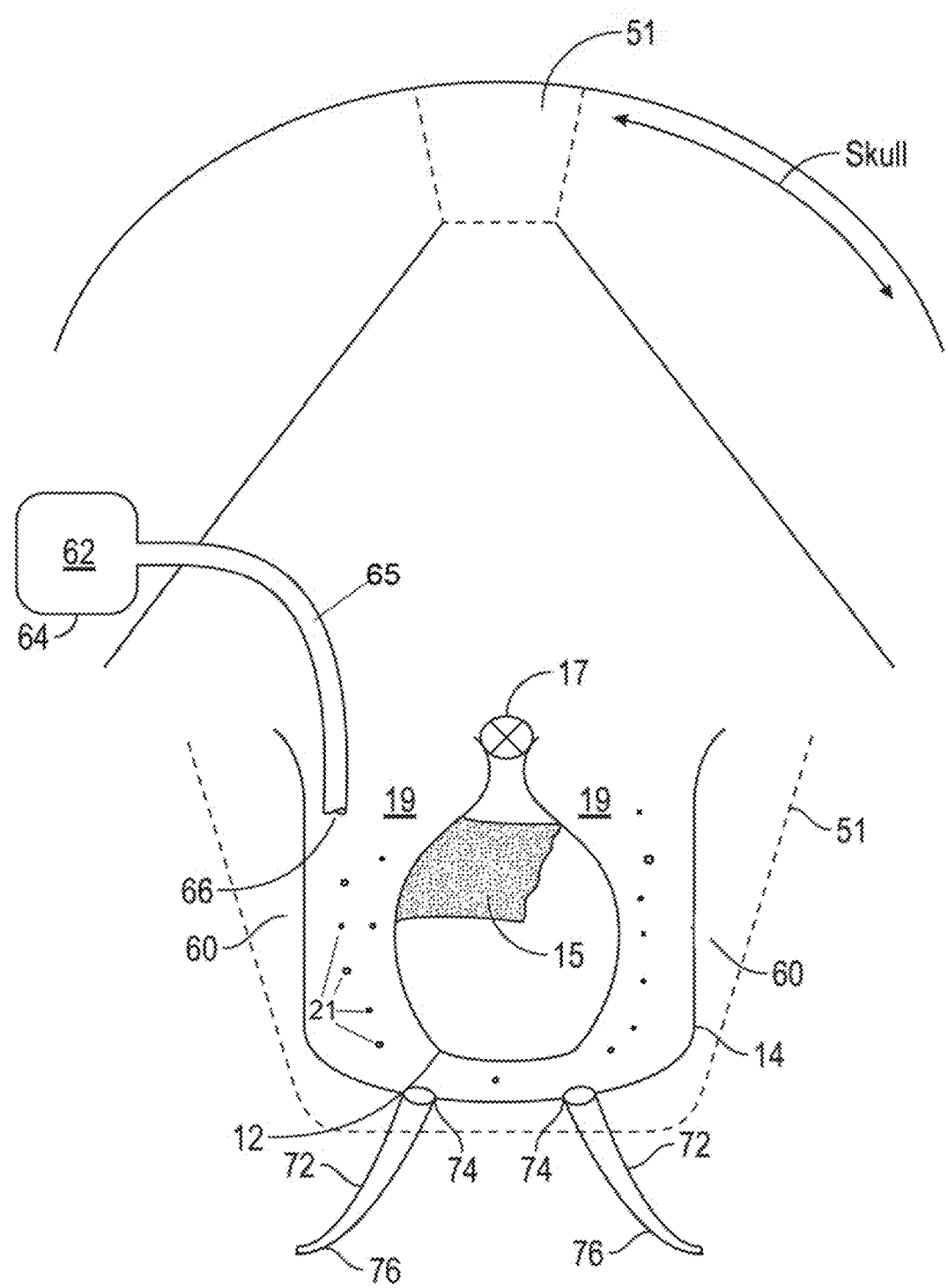
FIG. 3 is a schematic diagram of a two balloon implanted device in the skull of a patient, in accordance with features of the present invention.

In an embodiment of the invention, the scaffold is in thermal communication with the first balloon. The scaffold extends from the first balloon to the third balloon. The scaffold may be a thermally conductive material selected from the group consisting of nitinol or similar metals. Notwithstanding the foregoing, an embodiment of the invention is depicted in FIG. 3 which does not feature the scaffolding, rather, just a space 19 defined by the exterior surface of the first balloon 12 and an interior surface of the second balloon 14.

An outermost balloon 22, encapsulating the second balloon, provides a second void to facilitate drainage of potentially intervening fluids, blood, and other debris and is also utilized to provide local medications, nanoparticles, or other desired substances to the surface tissue. This second void may be utilized to remove post-surgical fluids. This second void may also be used to reverse the pressure gradient imposed by some medications, nanoparticles and other locally applied immunotherapies. Such a reversal provides a means for diffusing of some the aforementioned medications, nanoparticles and other substances. For example, pressure within the second void could be reversed to "insert" nanoparticles, immunotherapy and chemotherapy.

Nanoparticles (such as Ferro-magnetic particles) may be activated via ultrasound, radiofrequency or the aforementioned heat application to provide a third treatment modality. Ferromagnetic nanoparticle usage is attractive particularly as diffusion from the device may be enhanced (via for example osmotic or barometric pressure) and further directed by external magnets, and a plurality of diffusion ports (i.e., drain pores) defining the distal ends of the drain or drains. The nanoparticles are adsorbed into the tumor cells. Ferromagnetic nanoparticles remaining outside of the cells could be removed by reversing the osmotic barometric pressure gradient. The intracellular ferromagnetic nanoparticles would generate hyperthermia when subjected to externally applied emf or rapidly alternating magnetic fields. Both ferric and ferrous hydroxides are suitable, as are oxyhydroxides. Other nanoparticles may be substituted for the ferromagnetic ones given similar thermal profiles characteristics.

In an embodiment of the invention, ferrous particles may deliver very focused loci of heated fluid. In this instance, the number of apertures in the drains is increased by at least 50 percent over the typical number of apertures to optimize diffusion of nanoparticles or medication. Also the radiation dosimetry could be improved by the placement of many catheters with multiple source positions in each catheter in an attempt to approximate the liquid isotope.

One means for providing drainage from the excise site, or medicament delivery to the excise site is a conduit 24. The conduit 24 terminates in vivo, at a first end 26 at the excise site and at a second end 28 remote from the excise site (e.g., sub-galeal, subcutaneously and/or just overlying the scalp) or perhaps outside the body of the patient. This conduit may be turned on or off via a valve 27. A plurality of conduits may be provided and placed strategically to facilitate fluid diffusion or fluid removal as clinically indicated.

In an embodiment of the invention, the third balloon defines an exterior surface and the exterior surface conforms to an excision site of the tumor.

The second void also provides a further means for dose decrement. Dose decrement is due both to the geometry and attenuation from whatever material is within the second (or middle) void.

A unique feature of the invention is distributing heat evenly, or selectively, to a target site in a pulsating motion. (In the case of selective heat application, localization of heat would be controlled by an electrical feed-back mechanism enabled by the aforementioned thermocouples or sensors.) Activating or otherwise circulating the fluid(s) provide a means for homogenizing the heat application. Another temperature varying means is directing warmer or cooler fluids where needed based on information provided by various temperature probe-based feedback mechanisms. In addition, the clinician may desire that part of the appliance deliver more radiation and/or pulsating heat in a certain direction, and the invention offers that capability. An alternative is to circulate fluid externally because the specific heat of water is relatively high and quicker temperature changes would be needed.

The invented device further minimizes or otherwise manipulates undesirable cold/hot spots by changing the local thickness from which fluid within the spacer balloon circulates or manipulates locally applied electrical current.

Salient features of the invented design include the following:

It is adaptable to irregularly-shaped surgical cavities to increase uniformity of treatment delivery. For example, the invention facilitates the use of HDR via the incorporation of peripheral and central source positions within a void filled with circulating (e.g., pulsating) fluid. These positions facilitated via a plurality of access structures (see FIG. 6), integrally molded with the sides of the container (e.g., balloon) defining the void.

It is compatible with multiple radio-isotopic solutions, particles and other vehicles, thereby allowing physicians to select the vehicles based on clinical criteria;

It is equipped with continuous temperature monitoring, allowing an opportunity for real-time adjustment of fluid delivery to ensure most effective treatment while remaining in tolerable range.

An alternative to the middle balloon (or in addition to the middle balloon) is inclusion of high atomic material (e.g., high barn substances) within the radioisotope solution contained in the first balloon. This provides self-filtration of the radioisotope to remove low energy emanations. For example, the incorporation of high atomic number material in either the inner balloon void or the second solution is intended to relatively decrease the superficial radiation dose by absorbing relatively low radiations (e.g., less than 20 keV photons).

Brachytherapy Detail

Optimal potential treatment volumes embody different geometries depending on the resection site and therefore may not include a true sphere. The invention incorporates liquid isotope and spacer between the inner and middle balloons that may contain a form fitting mesh e.g. nitinol or other materials. The nitinol offers fatigue resistance with potential for outward radial pressure. Optionally, a pressure gradient could be utilized to help remove any post-operative interstitial fluid between the middle and outer most balloons and tissues; the gradient could be reversed if one wanted to diffuse medications nanoparticles etc. As such, the applied pressure resulting in the gradient may be either negative or positive, relative to the ambient pressure of the resected region, depending on whether positive or negative pressure is to be applied to the region.

There is some advantage to use a central source as the dose gradient defined as the maximal radiation dose closest to the sources and a prescription depth often 0.5 cm relatively improves as the source is further displaced from the target. This is the most common situation for HDR brachytherapy. The disadvantage is that it is a short linear source and the treatment target is at best spheroidal. HDR requires fractionation which is a compromise when compared to LDR brachytherapy, currently the standard of care. LDR sources (e.g., Iridium 192) have a more limited availability. Continuous low dose or very low dose radiation also have a theoretical biological advantage with higher Linear Energy Transfer. The risk of radiation unwanted exposure and leakage is being addressed including chelation of the sources to expedite excretion.

The liquid isotope would further improve the homogeneity of the radiation source(s) comparing almost infinite sources to fewer point sources could improve the dose gradients. The disadvantage of most liquid sources is the absence of an absorber of the undesirable lower energy radiation emanations. The addition of high Z material (discussed infra) to the radio isotopic solution or even incorporated into the balloon wall is a means to solve this issue.

The invented devices allow the use of HDR, LDR, or vLDR brachytherapy. In the brain, the standard of care is to limit the presence of a foreign body. This translates to limiting application to a few days (e.g., 3-5 days) unless in vivo studies determine that this issue is not a limitation. The geometry of the resection site may require more than one HDR catheter be loaded vLDR has a higher linear energy transfer (LET) and lower oxygen enhancement ratio (OER) which may translate to a better radio-biological response. The use of an isotope such as Sm 153 with a short half-life of less than two days is a compromise. The challenge is that it produces 71 percent beta (500-900 KEV) inasmuch much as a preferred objective is to minimize the Beta particles. Incidentally this is the same percentage of the earth covered by water. Whereas the use of an isotope with a longer half-life (such as 1125, at 59.5 days) may be more practical for an implant that would be used for a short time, the use of very low energies allows patients to be treated in a non-shielded room and even be in the public with reasonable restrictions.

The advantage of a liquid source is that the fluid will fill the space within certain limits. A central source is attractive as in HDR but should be spherical and would require a facility shielded room fractionation etc. Theoretically continuous radiation which had evolved over nearly a century which has an advantage, but may present a radio protection issue. In contrast, vLDR brachytherapy may offer treatment with better radiation exposure to others. Thermodynamics suggest that the temperature of two masses physically intertwined would equilibrate. Naively extrapolating the tissue surrounding a 5 cm diameter warm spheroid would have a modest temperature increase modified by heat sinks and other heat attenuation phenomena.

Hyperthermia
Detail

Presently hyperthermia is usually delivered by external applicators which of necessity is fractionated (i.e., not continuous). The invention solves this problem by incorporating a means of hyperthermia generation so as to continuously administer hyperthermic treatment. There are numerous local means to deliver the hyperthermia; as for example, by using a proposed nitinol mesh with electrical stimulation with feedback control. This requires a square wave DC source. Other means of generation of hyperthermia from nitinol include state change from austenite to martensite, and stress. Other hyperthermia sources generated externally may also be attractive. Microcomputer controlled feedback could be developed which was an obstacle in the past. A new modality; that is, concomitant continuous radiation and hyperthermia now becomes feasible is potentially available as an outpatient.

Electrical induced local heating could include a feedback mechanism. Other advantages include biocompatibility, production of radial pressure and fatigue resistance. Other nitinol based means to produce hyperthermia include stress and conversion between austenite and martinet.

The aforementioned possible theoretical third balloon offers the opportunity to remove any intervening fluid between the device and tissue. It offers the opportunity to deliver a variety of medications, nanoparticles etc.

Figure 2:
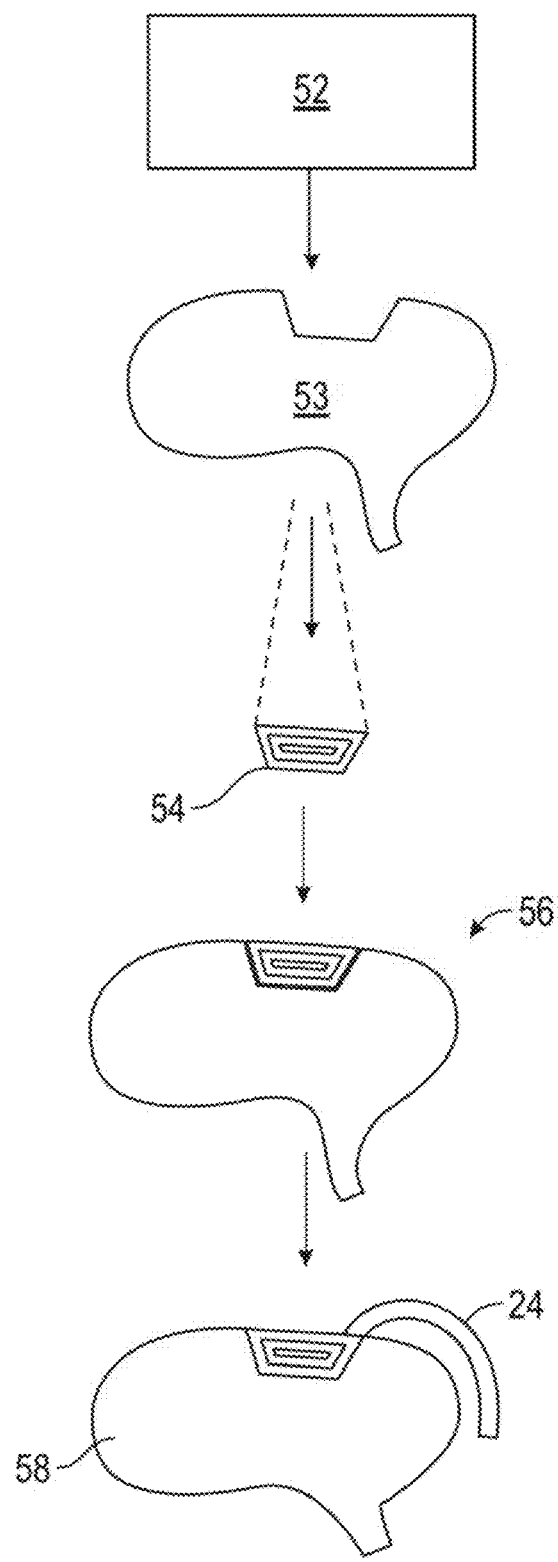
FIG. 2 is a flow chart of procedures associated with the invented method for treating glioblastoma, in accordance with features of the present invention.

FIG. 2 is a schematic depiction of the method for treating an excised tumor site. The method is designated generally as numeral 50. A first step 52 is an evaluation of the excised site 51, in terms of its location in the body (e.g., in instances of glioblastoma, the brain 53 would be the location). The site is evaluated for its width, depth, associated vasculature, and possible drainage routes for post-operative detritus. Assembly 54 of the afore-described construct is determined based on this situs evaluation. This assembly includes selection of radio-isotope to be contained in the center or innermost balloon 12, size of scaffolding 16 encircling the innermost balloon, and the size of the outermost balloon.

The bespoke construct is then placed 56 into the excise site 51, and the site closed via standard surgical closure techniques including suturing 58. Optionally, provisions are made for a drainage conduit, as also described supra.

Treatment includes simultaneous application of heat and radiation to the now closed excised site. Application of heat may be delayed until initial radiation treatment has begun.

FIG. 3 is a schematic diagram of the invented device implanted within the excised site 51 or surgical resection defect described in FIG. 2, supra. The figure shows the site 51 filled with a 2-balloon embodiment, the inner balloon 12 encapsulated by the second balloon 14. The voids space 19 as described supra, is shown between the first balloon 12 and second balloon. This space 19 is approximately 0.5 cm (e.g., between 0.3 and 0.7 cm) between the surfaces of the first and second balloon. It should be noted that the top of the second balloon is shown open for clarity in the figure.

FIG. 3 also shows a means for compressing fluid residing between the exterior surface of the second (in this embodiment, the outer-most) balloon 14 and inwardly facing surfaces of the resection site, those two surfaces defining a patient void 60. One compression means is a bulb 62 positioned either external of the body, or subcutaneously to allow patient actuation. The compression bulb 62 comprises a conduit 65 having a first proximal end 64 for patient actuation and a distal end 66 which is in fluid communication with the outer void 19. In this arrangement, the outer void 19 defines a compression chamber to provide fluid drainage and access to medications via imposition of a pressure gradient, as discussed supra.

The conduit 65 may also provide a means for directing heated, pulsating fluid into the outer void 19. Pressure within the void of the injected pulsating fluid would be controlled via fluid egress conduits 72 (FIG. 3) providing a means for evacuating fluid from the outer void 19 to outside the patient. Those conduits may feature one way check valves 73.

The outer void is also adapted to receive electronic probes for biofeed-back, such as temperature and pressure monitoring, and dosimetry measurements.

As noted supra, the outer void 19 may be populated with fluid egress conduits 72, the ends of those conduits having regions forming apertures, reminiscent of surgical drains. Each of the conduits 72 would have a first end 74 forming the multiple apertures residing within the void, and a second 76 end residing outside of the resected area 51. The apertures may be gauged to accommodate the positive or negative pressures imposed within the resected region, those pressures discussed supra. The egress conduits may be comprised of silicon, and other biocompatible materials.

The drainage tubing 72 could be used for diffusing medications and allow thin thermometry wires to determine the actual temperature. (The tubing 72 may also provide a means for maintain spacing between the outside surface of the second balloon 14 and the patient parenchyma surface 51 defining the resection cavity. This will aid in attaining the flat depth of dose curve discussed supra. In such instances, portions of the tubing between their proximal 74 and distal ends 76 may be radially expanded to define enhanced tissue engagement surfaces 75; this, to confer stability when contacting the patient surface 51.) The surface area of the balloon should be at least nearly that of the inner tissue rim either ½ cm or 1 cm.

In an embodiment of the invention, the outer void 19 may be populated with nanoparticles (element 29 in FIG. 3) which may be actuated by remotely applied electrical or mechanical means, including magnetic fields, emf radiation, electromagnetic resonance, ultra violet radiation, infrared radiation, and combinations thereof. The particles, dispersed throughout the outer void 19, may also be physically manipulated or actuated via osmotic and barometric pressure differentials. Concentrations of the nanoparticles will be varied, via the actuation of the fluid compression means 62 which maintains fluid communication with the outer void 19 via the distal end 66 of the compression means conduit 65.

Nanoparticles comprised of iron for example (e.g., iron oxide) may be manipulated remotely via an externally applied magnetic field to draw the nanoparticles or even the entire structure closer to aspects of the excise site that require either additional heating or higher doses of radiation. The nanoparticles may also be subjected to emf radiation to cause the particles to heat up and therefore increase in temperature.

Nanoparticles may also facilitate chemo-immunotherapy.

It should be appreciated that the above described one- and two-balloon arrangements are not relegated solely to the brain venue, but can also be applied to nasal cavity and nasopharynx venues, the gall bladder, urinary bladder, the breast, the ovaries, uterus, vagina, metastasis associated with the liver, cystic structures, post-surgical sites and other regions.

Separately, the inner balloon of the embodiment shown in FIG. 3 may also be partially overlaid with a foil 15 so as to prevent undesirable radiation exposure where not needed. The foil may be applied to any region of the balloon, for example its neck or collar, its base, its midsection, or a combination of these positions.

Figure 4A:
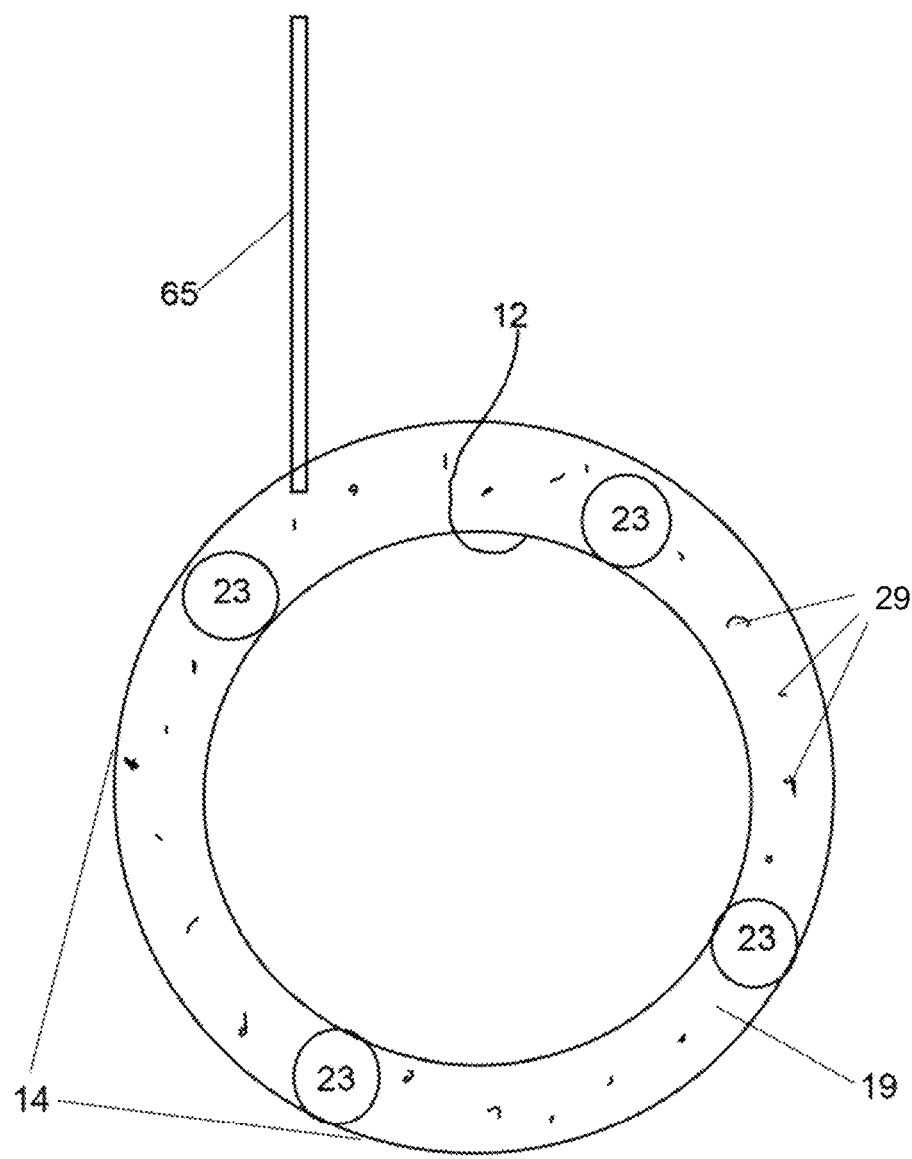
FIG. 4A is a detailed schematic elevational view of the two balloon configuration depicted in FIG. 3, in accordance with features of the present invention.
Figure 4B:
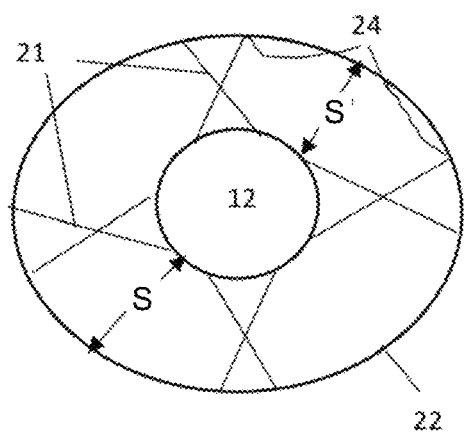
FIG. 4B is an elevational view of a balloon, scaffold, balloon configuration, in accordance with features of the present invention.

FIG. 4A provides another view of the two balloon configuration in FIG. 3, and shows the second balloon as completely enclosed. This depiction includes spacers 23 (shown as spheres) adhered to various regions of the exterior surface of the first balloon, and/or various regions of the interior surface of the second balloon 14. The spacers 23 are shown symmetrically arranged to provide unhindered fluidity to the nanoparticles traveling throughout the annular space 19 defined by the exterior surface and interior surfaces respectively of the first 12 and second 14 balloons. The spacers are sized and otherwise positioned to allow fluid flow around them. For example, the spacers may be glued or otherwise attached to one of the walls confining them, while sized to allow fluid to pass along the otherwise of the spacer that is not attached to the other wall.

The spacers may be asymmetrically arranged so as to skew or otherwise confine the nanoparticles to one region of the construct. This asymmetrical configuration may be beneficial when remote means for actuating/manipulating the particles are not available.

The spacers 23 may take the place of the aforementioned scaffolding 16 depicted in FIG. 1. Aside from the spheres as depicted, the spacers 23 may define protrusions or ridges that are integrally molded with the exterior surface of the first balloon 12 so as to remain stationary within the annular space 19. The protrusions and or ridges would manifest themselves as the balloon is inflated, and provide yet another means for fluid to flow pass the spacers.

As discussed supra, the nanoparticles 19 may be injected into the annular space 19 via the conduit 65.

Heat Source
Detail

Various means for producing heat may be utilized, for example circulating warmed fluids from outside the patient's body to the tumor site. Other heating means include subjecting the nitinol structure to DC current for a time sufficient to heat the structure to the desired temperature. Direct heating of the nitinol is more controllable. Whichever heat source is utilized, a feedback mechanism can be used to regulate the heat generation and its distribution.

To protect the patient from moving components, the entire heat pump may be encapsulated. A thermally conductive polymer may be used to encapsulate the heating end to ensure maximum heat transfer. The remainder of the system is encapsulated in a catheter system.

Increasing the latent heat of transformation will reduce the speed necessary to reach the desired effect, thereby increasing the device safety profile.

The goal is to maintain temperature within 0.1° C. over various periods of time. In an embodiment of the invention, the optimal temperature is empirically (e.g., though modeling or MRI) determined for various sites for the brain. Generally any temperature would be maintained at or less than 42 degrees C. over a period of time which is again determined empirically or experimentally to effect therapeutic value without damage to surrounding parenchyma. This system also allows for control over increasing or decreasing temperature on a rapid time-scale to adapt the hyperthermia aspect of the treatment method in response to treatment needs.

EXAMPLE

An embodiment of the invented system comprises an inner balloon made of biocompatible polymers. These biocompatible substrates may be thermally conductive organic and inorganic polymer material, such as cellulose nanofibers, (e.g., nanofiber/hydroxylated boron nitride nano-sheet film), poly butylene succinate nano-composites, and combinations thereof. The inner balloon will have variable dimensions depending on the receiving surgical cavity. It is leak-proof to contain radio-isotopic solution.

The scaffold or lattice work and the middle balloon is comprised of memory shaped material such as polymer similar to that of the inner balloon, and nitinol material. The polymer may include a silicone-bismuth film adhering to its exterior surface, wherein the silicone is used to further prevent leakage and the bismuth or some other high atomic number element is used as additional radiation shielding. Solutions containing high z elements (elements with relatively high numbers of protons in their nucleus, such as Ti, Cr, Al, Cu, V, Fe, Pb, Bi, etc.,) may be added to the radio isotope solution to minimize very low energy radiations. High atomic number (Z) materials used in various prostheses and for shielding electron beams produce dose perturbations. An accurate knowledge of dose perturbation and transmission through these materials is required for curative and re-irradiation planning which is not available for all clinical electron beams.

In an embodiment of the invention, the nitinol (or other) material may be a half centimeter thick or suitable thickness to maintain spacing between the innermost and middle balloon. This construct enabled effective containment of hyperthermic solutions.

The outer balloon will also comprise polymer material and define an inner void large enough to encompass or otherwise completely encapsulate the inner and middle balloons. This outer balloon is flexible enough to adapt to irregular cavity spaces. This outer balloon also has a means for draining post-surgical fluids via a surgical drain or conduit connected at its distal end (i.e. outside the patient) to a collapsed vacuum bulb or other negative pressure device.

Tables 1 and 2 provide simulation data comparing radiation doses at various depths over a span of 96 hours. Cesium 1-131 and Iodine 125 are the isotopes featured in the tables.

TABLE 1

Monte Carlo simulation comparing radiation dose from balloon surface for 50 Gy prescription dose to 5 mm depth.

| Depth from Surface (mm) | 2 cm Balloon | | 4 cm Balloon | |
| --- | --- | --- | --- | --- |
| | Cs-131, Gy | I-125 Gy | Cs-131, Gy | I-125, Gy |
| 0 | 154 | 160 | 107 | 112 |
| 2 | 88 | 90 | 74 | 76 |
| 4 | 50 | 60 | 56 | 57 |
| 6 | 43 | 42 | 45 | 44 |
| Activity (mCi) | 224 | 97 | 690 | 312 |

TABLE 2

Monte Carlo simulation comparing radiation dose from balloon surface for 60 Gy prescription dose to 10 mm depth.

| Depth from Surface (mm) | 2 cm Balloon | | 4 cm Balloon | |
| --- | --- | --- | --- | --- |
| | Cs-131, Gy | I-125 Gy | Cs-131, Gy | I-125, Gy |
| 0 | 487 | 397 | 284 | 232 |
| 2 | 279 | 223 | 197 | 158 |
| 4 | 188 | 148 | 150 | 119 |
| 6 | 135 | 105 | 119 | 92 |
| 8 | 102 | 78 | 96 | 74 |
| 10 | 60 | 60 | 60 | 60 |
| Activity (mCi) | 537 | 240 | 1387 | 649 |

Example 1

Optimization of thermal transmission is key to providing efficient patient treatment. Also, such optimization will result in a minimization of energy use, both radiologic and thermal. The invention provides improvements in therapeutic ratio efficiency by between 25 and 200 percent compared to state of the art protocols.

Figure 5:
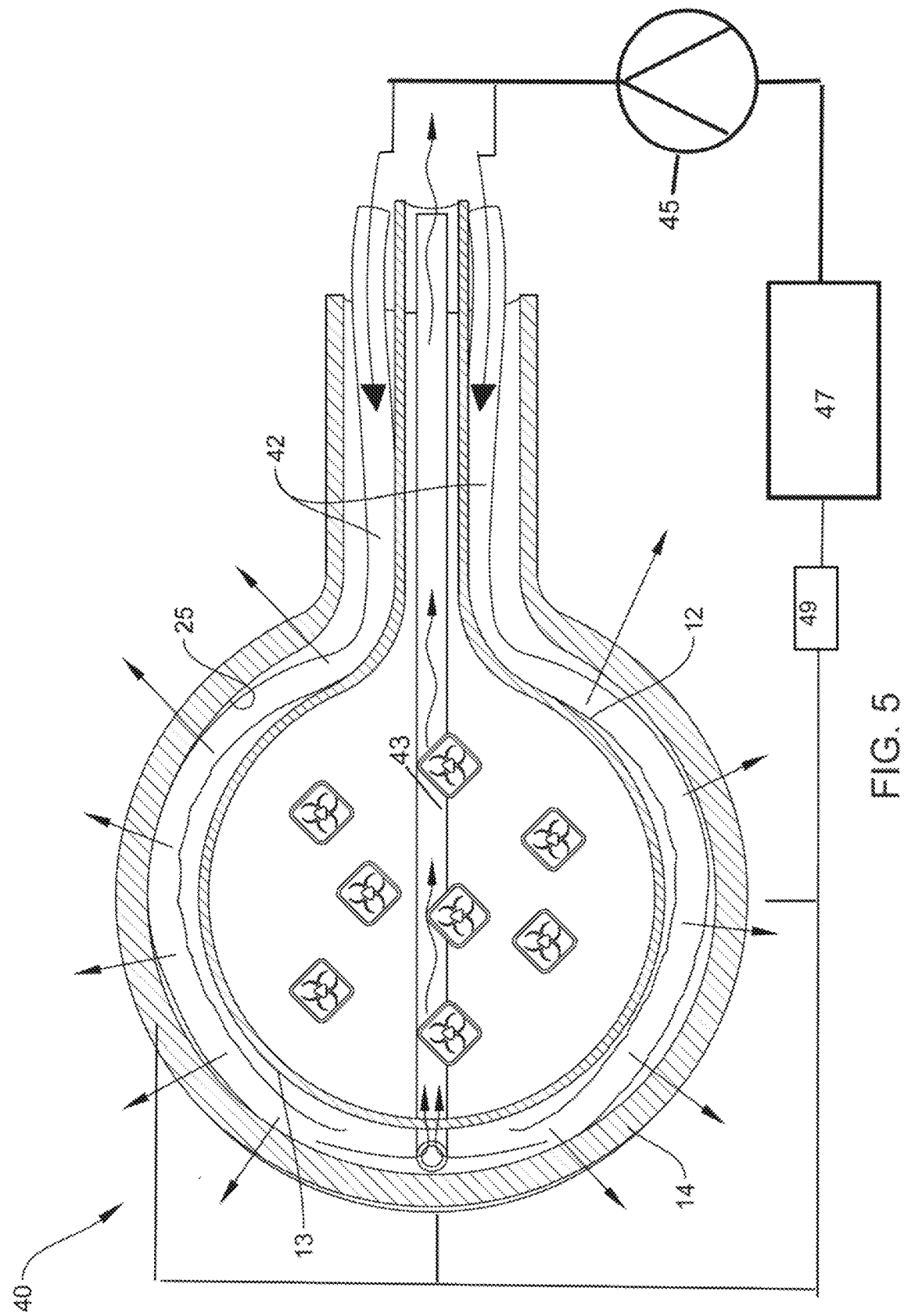
FIG. 5 is a schematic elevational view of a pulsating iteration of the hyperthermic/radiologic treatment device, in accordance with features of the present invention.

The following description enables the enhancement of thermal transmission to tumor site interface areas:

FIG. 5 is a cross sectional plan view of a device, generally designated as numeral 40, to provide both thermal and radiologic energy to a tumor excise site. As above, two balloons, an innermost balloon 12 and a radially offset second balloon 14 are utilized, wherein the second balloon encapsulates the innermost balloon 12.

Disposed between the outer surface 13 of the innermost balloon and the inner surface 25 of the second balloon is a first fluid conduit 42 adapted to receive thermally treated fluid. (It should be noted that the aforementioned thermal treatment may be a fluid cooling, or a fluid heating.) The conduit is shown enveloping the outer surface 13 of the innermost balloon 12, and medially disposed from the inner surface 25 of the second balloon 14. A centrally disposed second fluid conduit 43, extending the length of the device 40, evacuates the pulsating fluid from the construct, thereby providing a means of egress of for the fluid. The centrally disposed second fluid conduit 43 overlays the first balloon but is encapsulated by the second balloon 14. The centrally disposed second fluid conduit 43 has a first open distal end positioned remotely from the end of the first fluid conduit 42 receiving pulsating fluid. The centrally disposed second conduit 43 has a second open proximal end positioned at or very near to the pulsating fluid ingress end of the first conduit 42.

Temperature regulated fluid (e.g., water) is pumped through the conduit 42 so as to heat aspects of the second balloon which directly contacts margins (aka the rim) of a tumor excise site. One means for pulsating heated fluid comprises a reciprocating pump 45 harvesting fluid from a remotely situated fluid reservoir 47 for injection into the conduit. A controller 49 may be utilized to vary the pulsations, based on data feeds from sensors located on surfaces of the construct 40 that are remote from the pump. These data feeds may be facilitated via hardwire or via telemetry. For example, thin thermistors could be passed through the fluid ingress or egress water conduits, or between the balloons and scaffold, or through cannula drainage medication tubes discussed infra.

In an embodiment of the invention, the fluid is pulsed through the conduit 42 at a rate to prevent overheating of the margins of the excise site. Generally, a rate of between 1 cc/second and 100 cc/second is suitable, and preferably pulse rates of between 25 cc/second and 50 cc/sec. The water or fluid temperature is kept constant prior pulsating it through the brachytherapy structure, this to mimic the characteristics of blood flowing through the body.

Surprisingly and unexpectedly, the inventor has found that in such pulsing efforts, innermost portions (e.g., those portions physically confining the radio-isotope fluid) of the device remain warmer than peripheral portions of the device. This aids in preventing the overheating of healthy tissue, while also maximizing the effect of the combined hyperthermic/radiologic treatment protocol.

The pulsation allows for some relative cooling of the tissues placed closer to the heat source to flatten the thermal gradient. The frequency of the pulsations are empirically determined and will vary with variables such as geometric shapes of the excise site, the location of the site, and volume of the site. Generally, a frequency of one pulse every 1 to 30 seconds, preferably every 5 to 20 seconds, and most preferably every 10 to 15 seconds is suitable, with the pulsed fluid maintained at a specific temperature. This continually circulates relatively heated fluids at a predetermined temperature (e.g., constant temperature up to 44° C.) As such, pulsating fluids would be supplied and maintained at a temperature ranging from body temperature to 44 C, preferably from 38 to 43 C, and most preferably from 39 to 42 C. These constant temperature fluids may be pulsed at the above pulse rates. An exemplary pulse rate is one pulse every 5 seconds. Other pulsating paradigms include pulsating a fluid which changes temperature.

Volume of the pulsating fluid is gauged to the average resection volume and would range between 50 and 200 ccs, preferably between 80 and 160 ccs, and most preferably between 100 and 130 ccs. An exemplary volume is 115 ccs. The objective here is providing thermal treatment to all foreseeable rim interfaces so as to compensate for the convective heat loss due to the "heat sink" effect of the circulating blood in the rest of the brain.

With or without the aforementioned thermal pulsation feature, modification of the surfaces of the device contacting the tumor excise site margins will also enhance thermal treatment. Those modifications may include cones, ridges, and other protrusions from the surface. This will increase the surface area of the radiologic and thermal energy application surfaces. For example, four cm diameter spheroid e.g. has surface area of 50.24 cm$^2$ or 5024 mm$^2$. Using 2 mm squares such a spheroid would have 1250 such squares.

If the surfaces contained pyramids having 2 mm equal sided bases of 2 mm height, then the surface area of each would be $4 \times 1 \times 2 = 8$ mm$^2$. Multiplied by 1250 the total surface area=10,000 mm$^2$ or 100 sq cm, which is a ratio of about 2:1.

With a height 3 mm height, the surface area would be $1 \times 3 \times 4 = 12$ mm$^2$ such that given 1250 sections would provide a total surface area of 15000 mm$^2$ Thermal transmission is directly related to the area proximal to both the tumor excise site edges and the surface of the brachytherapy device. Note the surface areas calculation of both cones needs a subtraction modification for the base surface which is included in the google formula for 2 mm$^2$ that is mm$^2$-pi radius square=3.15 or 0.85 mm per mm$^2$.

Cone 30 mm$^2$ and 35 mm$^2$ for 2 and 3 mm height cone. In order to be less abrasive a parabolic cone is better tolerated. Parabolic cone surface area calculations for a 2 mm height the surface area equals $33 \times 1250$. For a 3 mm height cone, the surface area=$41 \times 1250$.

In an embodiment of the invention, the exterior surfaces of the radially projecting structures define a groove to enhance surface area of the surfaces. In instances where the radially projecting structures are cones, the bases of the cones are not included in the surface area calculation.

HDR (high dose rate) brachytherapy can be utilized as it is well accepted and the reimbursement is established. Radiation safety and assurance of positioning is also well established. Given that HDR seeds are sealed within their individual fluid-impervious capsules, those capsules may be mixed with the pulsating heated fluid for circulation within either the outer void 19 of the system shown in FIG. 3, or even the patient void 60, also shown in FIG. 3. So, in this embodiment, HDR seeds may reside in both the first balloon 15 and the outer void 19. Also, pulsating heated fluid may course through both the first balloon 15 and the outer void 19.

HDR sources are sealed and usually located in a catheter or needle and not directly in contact with any fluid. Rather, the HDR source may circulate within the heat transfer fluid, those fluids rapidly exchanged, particularly when a relatively higher specific heat circulating media such as water, saline, spinal fluid is utilized. This could provide a quicker means to change the temperature of the device or applicator.

In an embodiment of the invention, additional HDR catheters are positioned at the inner periphery of the applicator, those applicators in turn attached in tandem to the multiple drains/diffusing devices. In this instance, the drains are positioned such that the drain diffuser is closer to the target to offer some "spacing".

Furthermore, this would eliminate binding of the HDR source cable (which otherwise commonly occurs). An HDR source (shown as element number 64 in FIG. 6 is attached to a distal end of the source cable (element 66). As illustrated in FIG. 6, a reversibly deformable substrate 60 (such as a webbing or adherent film) is positioned between an HDR catheter 62 and other conduits (e.g., drain conduit 24 or heated fluid conduit 42). The catheter 62 is adapted to receive the HDR source delivery cable 66. In an embodiment of the system, the catheter is adapted to receive both the HDR source delivery cable and pulsating water serially or simultaneously.

During insertion and removal of the HDR source, any flexing occurring at the catheter 62/conduit 24 interface would be minimized by the reversibly deformable action of the reversibly deformable substrate 60.

Additional directional control in the drain diffusing tubing is conferred with the addition of a plurality of catheter conduits 62 which can also serve as medicament pores (FIG. 7B) defining the drain sieve at the egress end of the drain. Those pores 62 have larger diameters than typical drain sieve pores 70 and would be of a cross section so as to slidably receive the HDR source delivery cable 66. Further, the distal drain end depicted in FIG. 7B shows reversibly deformable substrate 60 circumscribing the drain conduit 24. The drain conduit 24 may be flush with the surface of the balloon as depicted in FIG. 7A. Alternatively, the egress end of the drain may extend away from the balloon as shown in FIG. 1.

Figure 8A:
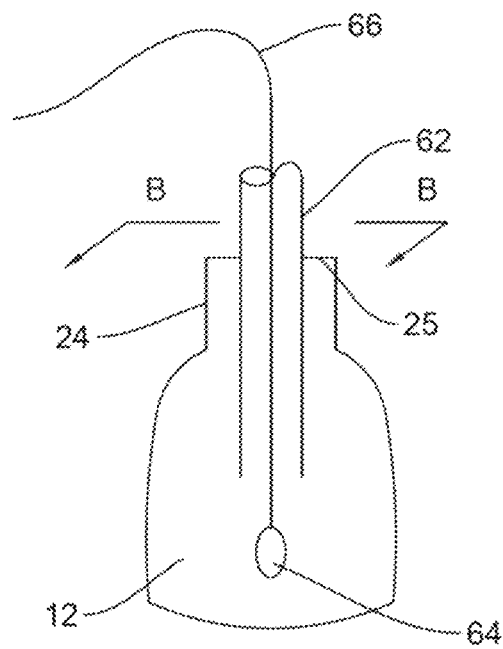
FIG. 8A is an elevational view of a HDR catheter-drain construct, in accordance with features of the present invention.
Figure 8B:
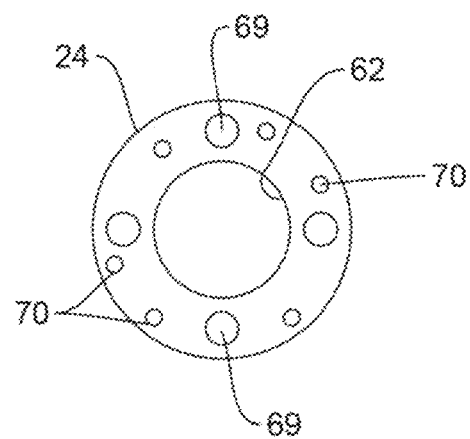
FIG. 8B is a view of FIG. 8A taken along line B-B.

FIGS. 8A and 8B shows an HDR catheter 62 coaxially arranged with a drain conduit 24 so as to be nested within that conduit. This coaxial fixation may be provided by a drain sieve 25 disposed between the conduit 24 and the catheter 62. The sieve comprises a plurality of drain pores 70 circumscribing the periphery defining the catheter. (As such, the sieve may define a disk having a center hole and smaller apertures circumscribing the hole.) These pores 70 may facilitate waste removal or pulsed fluid injection within the volume space 12 which is encapsulating and therefore confining the isotope. Liquid medicament pores 69 smaller than the HDR conduit 62 but larger than the drain sieve ports 70 may provide a means of ingress and egress for medicaments that are separate from the HDR conduits 62. FIG. 8B shows these medicament pores 69 symmetrically spaced about the sieve of the drain so as to be centrally located compared to the typical drainage pores 70, this to facilitate more uniform distribution of medicament.

Figure 9A:
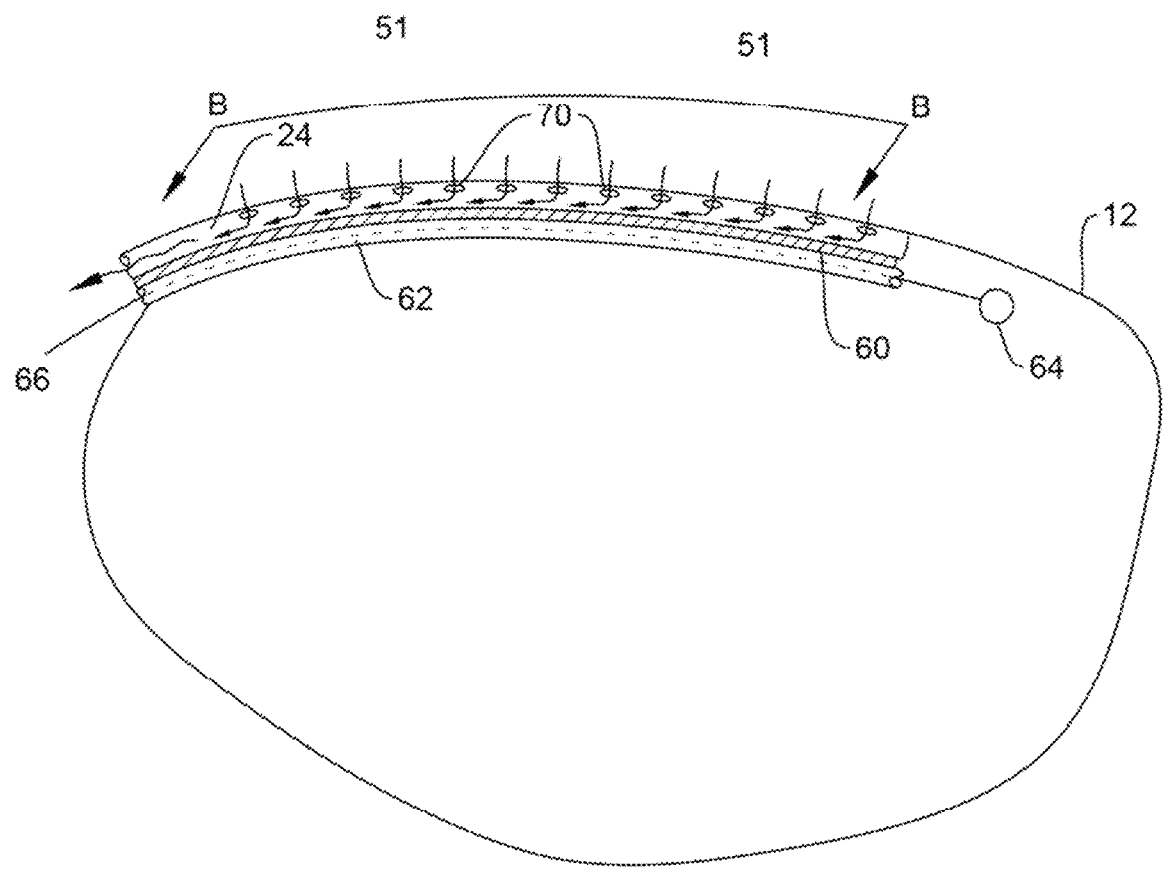
FIG. 9A is an elevational view a drain substrate integrally molded with a isotope containment bag, in accordance with features of the present invention.
Figure 9B:
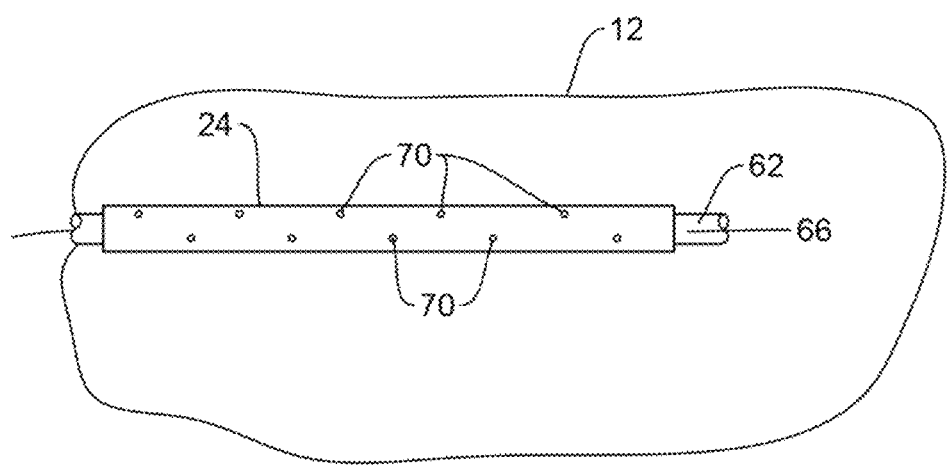
FIG. 9B is a view of FIG. 9A taken along line B-B.

FIG. 9A is an elevated view of a drain substrate integrally molded with an isotope containment bag (e.g., the inner balloon 12 discussed supra). FIG. 9B is a view of FIG. 9A taken along line B-B.

FIG. 9A depicts a drain substrate 24 defining a plurality of drain pores 70 to confer fluid communication between an excise site 51 and regions exterior of the patient. The drain substrate 24 is flexible and a part of the wall of the first balloon 12. Specifically, the drain substrate 24 has a first surface that is flush with the exterior surface of the balloon 12 and a second surface that faces the interior of the balloon. Contacting this second surface is the reversibly deformable substrate 60 (such as a webbing or adherent film) discussed supra. An HDR catheter 62 overlays this substrate 60 such that the substrate is sandwiched or otherwise disposed between the catheter 62 and the drain substrate 24. This configuration allows for flexion of the catheter 62 during insertion of an HDR source cable 66 and concomitant HDR source 64 without risking rupture or tearing of the drain substrate 24 from the balloon 12 or rupture of the balloon itself.

HDR requires a shielded treatment room, multiple treatments, and is considered a discontinuous (i.e., fractionated) radiation treatment. It is less conformal but this can be improved by peripheral spacing. Preferably, the spacing between source dwell positions less than or equal to 1.5 cm. Typical treatment course is twice a day 6 hours apart for 5 days.

Example 2

The vast majority of GBM's occur within the cerebral hemispheres with GBM's occurring within the spinal cord and brain stems infrequently. In order to understand the magnitude of the "heat sink" or thermal convection problem an example was described using round numbers. The average male brain weighs about 1350 grams and female's about 1200 grams. The cerebellum, also rarely is a site for GBMs weighs about 150 gm and brain stem about 75 gm. For illustrative purposes here; a 1000 gram weight of the typical site, frontal lobe, for a GBM will be assumed. The most frequent site for GBMs is the frontal lobe, usually ipsilaterally. The typical weight of an ipsilateral frontal lobe would be 250-300 gm with 8% consisting of vasculature. (20-24 cc) Please remember spheroids have the lowest surface area per volume and the resection site most probably is not a spheroid and barriers such as bone may shape the target.

Example

A 4 cm diameter (r-2 cm) defect post-surgical resection was constructed in vitro inasmuch as the rim of 80 percent potential recurrence sites typically has a radius of between 2.5 and 3 cm. (Recurrences are more likely to recur in the inner 2.5 cm radii rim). It is noteworthy that tumors and therefore surgical resection sites are seldom spherical but geometrically that shape is the most challenging. The specific target volumes is a rim of a centimeter thick e.g. with 2 cm spheroid device that would be the 3 cm radii sphere minus that of a 2 cm radii volume sphere or 113 cc minus 33.5 cc roughly in this crude example about 80 cc. The median resection volume is about 100 cc.

An inner balloon contained fluid isotope such as not to mix with the fluid confined to the outer void (19 in FIG. 3). Rather, the outer void was used solely for thermal heating, drainage, and possibly diffusion of medications. To retain a space-void, a third balloon with 1.5 cm r—with area=28 sq. cm and volume=14 cc assuming a 1.5 cm radii balloon was utilized containing an isotope, saline, etc.

Heat transfer occurred by conduction and/or convection which is proportional to the specific heats of differing material (the thickness of the wall of the balloon was ignored in this example), Kelvin temperature differences, and area of the surface of the interface. Total surface area in this example was approximately 35 square cm. The conduction loss on the outer surface to the rest of the brain assuming that it was a larger sphere, which it is not, would be 113 sq. cm, roughly a difference of 2.25 times. This is easily accomplished by changing the shape of the interface.

Ignoring the interface material and assuming a homogenous specific heat, conduction loss was compensated by increasing the surface area of the spheroid. In an embodiment of the invention, a second in-dwelling rim is created with the incorporation of a ½ cm spacer to improve the depth dose, assuming a circulating liquid for heating the internal void formed by an inner balloon. This would result in a radius of 1.5 cm or surface area of 28 cm sq. volume=14 cc.

An alternative is to electrically produce thermal energy without such a "rim". These options require an externally applied heat source. Most except electric based heating including nitinol, require an externally applied emf, electromagnetic etc., source and in practice would be fractionated. The thermal gradient resembles the radiation dose gradient. It is noteworthy that 80 percent or so of the gbm recurrences occur within the 1 cm rim but most occur with ½ cm of the rim.

Another issue is the heat sink or convection loss caused by circulating fluids mostly blood flow. The supposition in this simplified example is that convection loss or heat sink is related to the temperature differences and blood flows. In order to illustrate this problem assuming as in this example, an 80 cc target volume target has 8% vasculature or 6.4 cc per cardiac contraction and with a pulse of 70. That approximates a blood flow of approximately 450 cc per minute given that blood, saline, and brain tissue have a slightly lower specific heat then water.

Pulsating Minimizes
Thermal Loss

The inventor found that thermal loss via convection (usually by fluid movement) is attenuated by constant or pulsating heat as well as increasing the interface area. In vitro testing was performed (see data below) in which a balloon with a heating element was placed in the balloons with wide apertures. This balloon was placed in a water bath in which it was surrounded by sponges in which numerous thermometers were placed. Water was circulated into and out of the water bath. Sponges were placed in a sink with water at 100 F circulating at 500 cc per minute. The results show that the thermal gradient was eliminated or at least lessened. This is due to the structure closest to the heat source being relatively cooler.

While this specification discussed that thermal conduction could be improved by using cones parabolas or other shapes to increase the interface area, pulsation of heated fluid was another option. The cooling phase may cause reverse conduction.

Fluid was circulated as the thermal generator in the space between an inner isotope balloon and the framed outer balloon (such that the space is less than 20 cc in volume). Inasmuch as spacer framing and drains take up some of the space, the convection loss requires a change in volume of about 25 times per minute. The convective heat loss may actually even out the gradient.

Surgical defects will neither be spheroidal nor cuboidal but a mixture and specific for each patient. If the median surgical defect is 100 cc in volume. The cube root of 100 equates to about a 4.6 cm length for each side of the surgical site. In a spheroid would be ⁴⁄₃ pi radii cubed or radii of 2.9 cm.

In both the radiation and heat doses the geometry is critical. The use of central sources (e . . . , either HDR, which is intermittent brachytherapy, or a continuous high activity source such as Iridium 192) often require special clinical environments and other considerations. The higher energies associated with these scenarios improves the dose gradient.

The central source would be located in the inner balloon surrounded by a spacer balloon. The reason for the spacer is to allow flattening both the hyperthermic and radiation gradients. In some instances the flattening of the gradients will result in a flat dose curve. These sources accommodate symmetrical shaping.

Another mechanism has been devised to allow non symmetrical conformality, namely a dynamic structure with a small balloon filled around the central sources or a compensating mold made after the surgery. If thermal generation occurs in the center of the device, a "dead" space could also flatten the thermal gradient.

It is also possible to thermally compensate for non-conformality of the device by selective electrical heating. In this instance, the GBM device would be connected externally and offer a reasonable access point. Thermometry: very thin thermistors could be passed thru the drainage/medication tube.

TABLE 3

Pulsating heat gradients induced in a spheroid

|  | Center | Proximal to Center | Proximal to Rim | Rim |
|---|---|---|---|---|
| Heat | 115.3 | 116 | 103 | 100.5 |
| Cool | 100.5 | 99.5 | 95.9 | 100.5 |
| Heat | 114 | 107 | 108 | 100.7 |
| Heat | 116 | 101.8 | 100.4 | 98.7 |
| Cool | 100.5 | 101.8 | 101.6 | 101.3 |

The data presented in Table 3 demonstrates the relative cooling in positions closer to the heat source inside a fluid filled container compared to the physiological venue (excise site rim) situated more distal from the heat source.

Brain Tissue
Model Detail

In approximating a device that would raise the desired temperature in the water bath over a reasonable time, the inventor found that the random temperatures in the water bath (with sponges to approximate brain tissue) could be raised significantly 5 to 15 C. The proximal portion of the rim would be hotter than the distal portion and would disproportionally cool faster.

The frontal lobe is a reasonable site to apply in vitro observations, given the prevalence of GBMs there and relative size of the frontal lobes. Assuming the frontal lobe is 250 cc in volume, the resection site volume is 125 cc, the minute cardiac ejection as 5 liters, the brain's 8 percent vascularity, and a 2 cm radius spheroidal device; the following measurements pertain to frontal lobe applications:

A. Area of 2 cm sphere;
B. Volume of ½ cm target rim;
C. Area/volume of 1 cm rim;
D. Minute Volume of space through which blood flows; and
E. 22 percent brain blood infusion from the heart.

Table 5, below provides blood flow values for various sphere radii for parameters A-D supra.

TABLE 5

Effect on blood flow with changing sphere radii:

| Radius | A | B | C | D |
|---|---|---|---|---|
| 2 cm | 50.25 cm$^2$ | 31.66 cc | 24 cm$^2$ | 8 cc |
| 2.5 cm | 78.5 | 65.4 | 37.5 | 15.625 |
| 3. cm | 113 | 113 | 54 | 27 |

Inasmuch as spherically-shaped tumor excise sites confer the lowest surface area per volume compared to other geometric shapes, and inasmuch as spherically-shaped excise sites and spherically shaped medicament/isotope delivery vehicles (i.e., balloons) are known in brachytherapy applications, alternative vehicle shapes and excise site shapes confer greater thermal communication with patient parenchyma.

Table 6 compares the surface area to volumes of various geometric shapes, given an excise area of 113 cc.

TABLE 6

| Shape | Dimensions (cm) | Surface Area (cm$^2$) | Volume (cc) |
|---|---|---|---|
| Sphere | Radius | 113 | 113 |
|  | Inner Rim 3.5* | 154 | 180 |
|  | Outer Rim 4 | 201 | 368 |
| Cube | 3.63 per edge | 79 | 49 |
|  | ½ cm rim | 129 | 99 |
|  | 1 cm rim | 190 | 178 |
| Rectangle | 3 × 4 × 5 | 94 | 60 |
|  | ½ rim | 148 | 120 |
|  | 1 rim | 214 | 210 |

*"Rim" designations are the distances beyond the periphery of the actual tumor excise site. So a ½ cm rim is that tissue radially disposed from the surface of the tumor excise wall so as to be further embedded within the patient.

These data are presented to show the empirical nature of determining pulsing liquid amounts, given various tumor excise site shapes. Thermal conduction is proportional to the surface area of the interface.

It is to be understood that the above description is intended to be illustrative, and not restrictive. The above-described embodiments (and/or aspects thereof) may be used in combination with each other. In addition, many modifications may be made to adapt a particular situation or material to the teachings of the invention without departing from its scope. For example, nanoparticles medicaments can be diffused from the outer or third balloon possibly enhanced by positive osmotic or other pressure. Ferrous-based nanoparticles will emanate heat when subjected to radio frequencies, ultra sonic radiation or other means to provide supplemental hyperthermia. Also, an appropriate antenna constructed perhaps of nitinol may generate radio frequency, ultrasonic or other means can generate heat, leading to treatment via hyperthermia, as described supra.

While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discuss d above. In the same manner, all ratios disclosed herein also include all sub-ratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for treating a tumor excise site defined by a center and edges, the method comprising simultaneously exposing the tumor site to radiation and pulsating heated fluid wherein the radiation emanates from radio-isotopes selected from the group consisting of cesium-133, iodine 125, samarium, ytterbium, palladium, iridium, and combinations thereof and wherein the radio-isotopes are confined to a first void space and detritus is confined to a second void space which encapsulates the first void space.

2. The method as recited in claim 1 wherein the first void space is defined by a first flexible container and the second void space is defined by a second flexible container which encapsulates the first container such that the second flexible container conforms to the excise site.

3. The method as recited in claim 2 wherein the second flexible container further comprises a conduit with a first end terminating at the excise site and a second end terminating outside a patient.

4. The method as recited in claim 1 wherein the heated fluid is pulsed at a rate of between 1 cc/second and 100 cc/second.

5. The method as recited in claim 1 wherein the heated fluid is pulsed once every 1 to 30 seconds.

6. A method for treating a tumor excise site defined by a center and edges, the method comprising simultaneously exposing the tumor site to radiation and pulsating heat, wherein the pulsating heat establishes a heat gradient wherein regions proximal to the center of the excise site are cooler relative to regions proximal to the edges of the site.

7. The method as recited in claim 6 wherein application of the pulsating heat continues to maintain the gradient.

8. The method as recited in claim 6 wherein the heat is contained in a fluid and the fluid is pulsed at a rate of between 1 cc/second and 100 cc/second.

9. The method as recited in claim 6 wherein the heat is contained in a fluid and the fluid is pulsed once every 1 to 30 seconds.

10. A device for treating a tumor excise site defined by a center and edges, the device comprising:
  a) a reversibly deformable container adapted to receive radio-isotope;
  b) a first temperature sensor at the center and a second temperature sensor at the edges;
  c) a conduit to direct pulsated, heated fluid to the center;
  d) a reciprocating pump harvesting fluid from a remotely situated fluid reservoir for injection into the conduit; and
  e) a controller programmed to energize and de-energize the pump when predetermined first temperatures and second temperatures are reached.

11. The device as recited in claim 10 wherein the controller affects a cooler center relative to the edges.

\* \* \* \* \*